(12) United States Patent
Hong et al.

(10) Patent No.: US 9,331,737 B2
(45) Date of Patent: May 3, 2016

(54) SYSTEMS AND METHODS FOR CANCELLING INTERFERENCE USING MULTIPLE ATTENUATION DELAYS

(71) Applicant: The Board of Trustees of the Leland Stanford Junior University, Palo Alto, CA (US)

(72) Inventors: Steven Hong, Stanford, CA (US); Jeff Mehlman, Mountain View, CA (US); Dinesh Bharadia, Stanford, CA (US); Sachin Katti, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 45 days.

(21) Appl. No.: 13/913,323

(22) Filed: Jun. 7, 2013

(65) Prior Publication Data

US 2013/0301488 A1  Nov. 14, 2013

Related U.S. Application Data

(63) Continuation-in-part of application No. 13/762,043, filed on Feb. 7, 2013.

(60) Provisional application No. 61/657,567, filed on Jun. 8, 2012, provisional application No. 61/596,628, filed on Feb. 8, 2012.

(51) Int. Cl.
*H04B 1/06* (2006.01)
*H04B 7/00* (2006.01)
(Continued)

(52) U.S. Cl.
CPC ...... *H04B 1/56* (2013.01); *H04B 1/126* (2013.01); *H04B 1/525* (2013.01)

(58) Field of Classification Search
USPC ......... 455/78, 278.1, 296, 307; 370/276, 277, 370/282, 286, 290
See application file for complete search history.

(56) References Cited

U.S. PATENT DOCUMENTS 3,922,617 A  11/1975  Denniston
4,952,193 A  8/1990  Talwar
(Continued)

FOREIGN PATENT DOCUMENTS

EP  755141 A2  10/2005
EP  02237434 A1  2/2009
(Continued)

OTHER PUBLICATIONS

International Search Report for PCT Application No. PCT/US2013/044830 mailed Sep. 26, 2013, 2 pages.
(Continued)

*Primary Examiner* — Nguyen Vo
(74) *Attorney, Agent, or Firm* — Alston & Bird LLP

(57) ABSTRACT

A wireless communication device includes, in part, at least one antenna for receiving or transmitting a signal, and a cancelation circuit adapted to cancel or reduce the self-interference signal. The cancelation circuit includes, in part, a control block, N delay and attenuation paths, a combiner, and a subtractor. Each path includes a delay element and a variable attenuator whose attenuation level varies in response to a control signal generated by the control block. Each path receives a sample of the transmit signal and generates a delayed and attenuated (weighted) version of the sample signal. The combiner combines the N delayed and weighted versions of the sample signal to construct a signal representative of the self-interference signal. The subtractor subtracts the constructed signal from the received signal thereby the cancel or reduce the self-interference signal therefrom.

26 Claims, 10 Drawing Sheets

(51) Int. Cl.
  *H04B 1/10* (2006.01)
  *H04B 1/56* (2006.01)
  *H04B 1/12* (2006.01)
  *H04B 1/525* (2015.01)

(56) References Cited

U.S. PATENT DOCUMENTS

| | | | |
|---|---|---|---|
| 5,691,978 | A | 11/1997 | Kenworthy |
| 5,930,301 | A * | 7/1999 | Chester et al. ............... 375/296 |
| 6,215,812 | B1 | 4/2001 | Young et al. |
| 6,411,250 | B1 | 6/2002 | Oswald et al. |
| 6,639,551 | B2 | 10/2003 | Li et al. |
| 7,336,940 | B2 | 2/2008 | Smithson |
| 8,055,235 | B1 | 11/2011 | Gupta et al. |
| 8,086,191 | B2 * | 12/2011 | Fukuda et al. ............. 455/114.2 |
| 8,175,535 | B2 | 5/2012 | Mu |
| 8,179,990 | B2 | 5/2012 | Orlik et al. |
| 8,331,477 | B2 | 12/2012 | Huang et al. |
| 8,351,533 | B2 | 1/2013 | Shrivastava et al. |
| 8,385,871 | B2 * | 2/2013 | Wyville ....................... 455/280 |
| 8,755,756 | B1 | 6/2014 | Zhang et al. |
| 2004/0106381 | A1 | 6/2004 | Tiller |
| 2005/0129152 | A1 | 6/2005 | Hillstrom |
| 2005/0254555 | A1 | 11/2005 | Teague |
| 2006/0083297 | A1 | 4/2006 | Yan et al. |
| 2007/0105509 | A1 | 5/2007 | Muhammad et al. |
| 2007/0207747 | A1 | 9/2007 | Johnson et al. |
| 2007/0249314 | A1 * | 10/2007 | Sanders et al. ............... 455/296 |
| 2008/0107046 | A1 | 5/2008 | Kangasmaa et al. |
| 2008/0131133 | A1 | 6/2008 | Blunt et al. |
| 2008/0219377 | A1 | 9/2008 | Nisbet |
| 2009/0022089 | A1 | 1/2009 | Rudrapatna |
| 2009/0034437 | A1 | 2/2009 | Shin et al. |
| 2009/0047914 | A1 | 2/2009 | Axness et al. |
| 2009/0180404 | A1 | 7/2009 | Jung et al. |
| 2010/0014600 | A1 | 1/2010 | Li et al. |
| 2010/0022201 | A1 | 1/2010 | Vandenameele |
| 2010/0103900 | A1 | 4/2010 | Yeh et al. |
| 2010/0150033 | A1 | 6/2010 | Zinser et al. |
| 2010/0226416 | A1 | 9/2010 | Dent et al. |
| 2010/0226448 | A1 | 9/2010 | Dent |
| 2010/0232324 | A1 | 9/2010 | Radunovic et al. |
| 2010/0279602 | A1 | 11/2010 | Larsson et al. |
| 2011/0013684 | A1 | 1/2011 | Semenov et al. |
| 2011/0026509 | A1 | 2/2011 | Tanaka |
| 2011/0171922 | A1 | 7/2011 | Kim et al. |
| 2011/0222631 | A1 | 9/2011 | Jong |
| 2011/0243202 | A1 | 10/2011 | Lakkis |
| 2011/0256857 | A1 * | 10/2011 | Chen et al. ................. 455/422.1 |
| 2011/0268232 | A1 | 11/2011 | Park et al. |
| 2011/0319044 | A1 | 12/2011 | Bornazyan |
| 2012/0063369 | A1 | 3/2012 | Lin et al. |
| 2012/0063373 | A1 | 3/2012 | Chincholi et al. |
| 2012/0140685 | A1 * | 6/2012 | Lederer et al. ............... 370/286 |
| 2012/0147790 | A1 | 6/2012 | Khojastepour et al. |
| 2012/0154249 | A1 | 6/2012 | Khojastepour et al. |
| 2012/0155335 | A1 | 6/2012 | Khojastepour et al. |
| 2012/0155336 | A1 | 6/2012 | Khojastepour et al. |
| 2012/0201153 | A1 | 8/2012 | Bjaradia et al. |
| 2012/0201173 | A1 | 8/2012 | Jain et al. |
| 2013/0005284 | A1 | 1/2013 | Dalipi |
| 2013/0215805 | A1 | 8/2013 | Hong et al. |
| 2014/0169236 | A1 | 6/2014 | Choi et al. |
| 2014/0206300 | A1 | 7/2014 | Hahn et al. |
| 2014/0219139 | A1 | 8/2014 | Choi et al. |
| 2014/0348018 | A1 | 11/2014 | Bharadia et al. |

FOREIGN PATENT DOCUMENTS

| | | |
|---|---|---|
| EP | 2267946 A2 | 12/2010 |
| RU | 2256985 C2 | 7/2005 |
| WO | 2013/185106 A1 | 12/2013 |
| WO | 2014/093916 | 6/2014 |

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.
International Search Report and Written Opinion for PCT Application No. PCT/US2012/023183 mailed May 17, 2012, 6 pages.
International Search Report and Written Opinion for PCT Application No. PCT/US2012/023184 mailed May 17, 2012, 6 pages.
International Preliminary Report on Patentablility for PCT Application No. PCT/US2012/023184 issued Aug. 6, 2013, 5 pages.
International Preliminary Report on Patentablility for PCT Application No. PCT/US2012/023183 issued Aug. 6, 2013, 5 pages.
International Search Report and Written Opinion for PCT Application No. PCT/US2013/044830, mailed Sep. 26, 2013, 4 pages.
International Search Report and Written Opinion for PCT Application No. PCT/US2013/075166 mailed Apr. 22, 2014, 11 pages.
International Search Report and Written Opinion for PCT Application No. PCT/US2014/014726 mailed Jun. 2, 2014, 38 pages.
International Preliminary Report on Patentablility for PCT Application No. PCT/US2013/044830, mailed Dec. 9, 2014, 5 pages.
International Search Report and Written Opinion for PCT Application No. PCT/US2014/050584 mailed Jan. 21, 2015, 11 pages.
International Search Report and Written Opinion for PCT Application No. PCT/US2014/065814 mailed Feb. 19, 2015. 11 pages.
Non-Final Office Action for U.S. Appl. No. 13/293,069 mailed on Jul. 17, 2013, 13 pages.
Non-Final Office Action for U.S. Appl. No. 13/293,072 mailed on Jul. 19, 2013, 11 pages.
Final Office Action for U.S. Appl. No. 13/293,072 mailed on Mar. 31, 2014, 10 pages.
Non-Final Office Action for U.S. Appl. No. 13/293,069 mailed on May 1, 2014, 17 pages.
Final Office Action for U.S. Appl. No. 13/293,069 mailed on Oct. 21, 2014, 18 pages.
Non-Final Office Action for U.S. Appl. No. 13/913,323 mailed on Mar. 12, 2015, 11 pages.
Final Office Action for U.S. Appl. No. 13/913,323 mailed on Apr. 21, 2015, 5 pages.
Extended Search Report as issued in corresponding European Application No. 13801200.0, dated Feb. 4, 2016.

* cited by examiner

SYSTEMS AND METHODS FOR CANCELLING INTERFERENCE USING MULTIPLE ATTENUATION DELAYS

CROSS-REFERENCES TO RELATED APPLICATIONS

The present application claims priority to U.S. Provisional Patent Application No. 61/657,567, filed Jun. 8, 2012, and entitled "Multiple Tap Feed Forward Cancellation," and is a continuation-in-part of U.S. patent application Ser. No. 13/762,043, filed Feb. 7, 2013, and entitled "Systems and Methods for Full-Duplex Signal Shaping," which claims priority to U.S. Provisional Patent Application No. 61/596,628, filed Feb. 8, 2012, and entitled "Enabling Algorithms and RF Circuitry for Full-duplex Communication Over Arbitrary Spectrum Fragments," the contents of all of which are incorporated herein by reference in their entirety.

FIELD OF THE INVENTION

The present invention relates to wireless communication systems, and more particularly to cancellation or reduction of self-interference in full-duplex communication systems.

BACKGROUND

A wireless communication system operating in a half-duplex mode may use the same frequency to either transmit or receive data. When operating in a full-duplex mode, the system may simultaneously transmit and receive data but the simultaneous transmission and reception of data occur at different frequencies. For example, a full-duplex cell phone uses a first frequency for transmission and a second frequency for reception of signals. Using the same frequency for simultaneous transmission and reception in a conventional wireless system results in significant amount of self-interference at the receiver thereby rendering the system ineffective in receiving the desired signal. Reducing the self-interference signal in a full duplex wireless communication system remains a challenge.

BRIEF SUMMARY OF THE INVENTION

A wireless communication device, in accordance with one embodiment of the present invention, includes, in part, at least one antenna for receiving or transmitting a signal, and a cancelation circuit adapted to cancel or reduce the self-interference signal. The cancelation circuit includes, in part, a control block, N delay and attenuation paths, a combiner, and a subtractor. Each path includes a delay element and an associated variable attenuator whose attenuation level varies in response to the control block. Each path receives a sample of the transmit signal and generates a delayed and weighted version of the sample signal. The combiner is adapted to combine the N delayed and weighted versions of the sample signal to construct a signal representative of a first portion of the self-interference signal. The subtractor is adapted to subtract the constructed signal from the received signal. N is an integer greater than or equal to 2.

In one embodiment, the delay generated by at least one of the delay elements is shorter than an arrival time of a sample of the transmit signal received at the subtractor, and the delay generated by at least another one of the delay elements is longer than the arrival time of the sample of the transmit signal at the subtractor. In one embodiment, the N paths include 2M paths forming M associated pairs of delay paths. The delays generated by the delay elements of each associated pair of delay paths form a time window within which time the second sample of the transmit signal arrives at the subtractor.

In one embodiment, N is equal to 2M and is thus an even number. In another embodiment, N is an odd number, therefore, the 2M paths form a subset of the N paths. In one embodiment, the controller determines the attenuation levels of the variable attenuators in accordance with values of intersections of an estimate of the self-interference signal and 2M sinc functions centered at the boundaries of the M windows. In one embodiment, the peak value of at least a subset of the 2M sinc functions is selected to be substantially equal to an amplitude of the estimate of the self-interference signal.

In one embodiment, the cancellation circuit further includes, in part, a splitter adapted to generate the sample of transmit signal to the delay paths. In one embodiment, the subtractor is a balun. In one embodiment, the communication device further includes an isolator having a first port coupled to the antenna, a second port coupled to a transmit line of the wireless communication device, and a third port coupled to a receive line of the wireless communication device. In one embodiment, the isolator is a circulator.

In one embodiment, the wireless communication further includes, in part, a frequency downconverter configured to downconvert an output signal of the subtractor, a filter adapted to filter out unselected portions of the downconverted signal, and an analog-to-digital converter adapted to convert an output signal of the filter to a digital signal. In one embodiment, the wireless communication further includes, in part, a processing engine configured to remove a second portion of the self-interference signal from the output signal of the analog-to-digital converter. The processing engine optionally includes a plurality of programmable filters. In one embodiment, the wireless communication further includes, in part a frequency upconverter configured to upconvert a transmit signal, a filter adapted to filter out unselected portions of the upconverted signal, and a digital-to-analog converter adapted to convert an output signal of the filter to an analog signal.

A method of canceling or reducing a self-interference signal, in accordance with one embodiment of the present invention, includes, in part, receiving a first sample of a transmit signal at a receiver, generating N delayed versions of the first sample of the transmit signal, attenuating the N delayed signals to generate N attenuated and delayed signals, combining the N attenuated and delayed signals to generate a combined signal representative of a first portion of a self-interference signal, and subtracting the combined signal from the received signal.

In one embodiment, the delay associated with a first one of the N delayed versions of the first sample of the transmit signal is set to a value less than an arrival time of a second sample of the transmit signal, and the delay associated with a second one of the N delayed versions of the first sample of the transmit signal is set to a value less than the arrival time of a second sample of the transmit signal.

In one embodiment, the method of cancellation further includes, in part, forming M time windows from the N delay paths, and selecting the delays such that the arrival time of the second sample of the transmit signal falls within each of the M time windows. In one embodiment, N is equal to 2M and is thus an even number. In another embodiment, N is an odd number, therefore, the 2M paths form a subset of the N paths. In one embodiment, the controller determines the attenuation levels are determined in accordance with values of intersections of an estimate of the self-interference signal and 2M sinc functions centered at the boundaries of the M windows. In one embodiment, the peak value of at least a subset of the 2M sinc functions is selected to be substantially equal to an amplitude of the estimate of the self-interference signal. In one embodiment, the first sample of the transmit signal is received via a splitter. In one embodiment, the combined signal is subtracted from the received signal via a balun.

In one embodiment, the method of cancellation further includes, in part, coupling a first port of an isolator to an antenna used by the receiver to receive signals, coupling a second port of the isolator to the receiver, and coupling a third port of the isolator to a transmitter causing self-interference at the receiver. In one embodiment, the isolator is a circulator.

In one embodiment, the method of cancellation further includes, in part, downconverting the difference between the combined signal and the received signal to generate a downconverted signal, filtering out unselected portions of the downconverted signal, and converting the filtered signal to a digital signal. In one embodiment, the method of cancellation further includes, in part, removing a second portion of the self-interference signal from the converted digital signal.

In one embodiment, the method of cancellation further includes, in part, removing a second portion of the self-interference signal from the converted digital signal using a plurality of programmable filters. In one embodiment, the method of cancellation further includes, in part, upconverting a transmit signal, filtering out unselected portions of the upconverted signal, and converting the filtered signal to an analog signal.

DETAILED DESCRIPTION OF THE INVENTION

Figure 1:
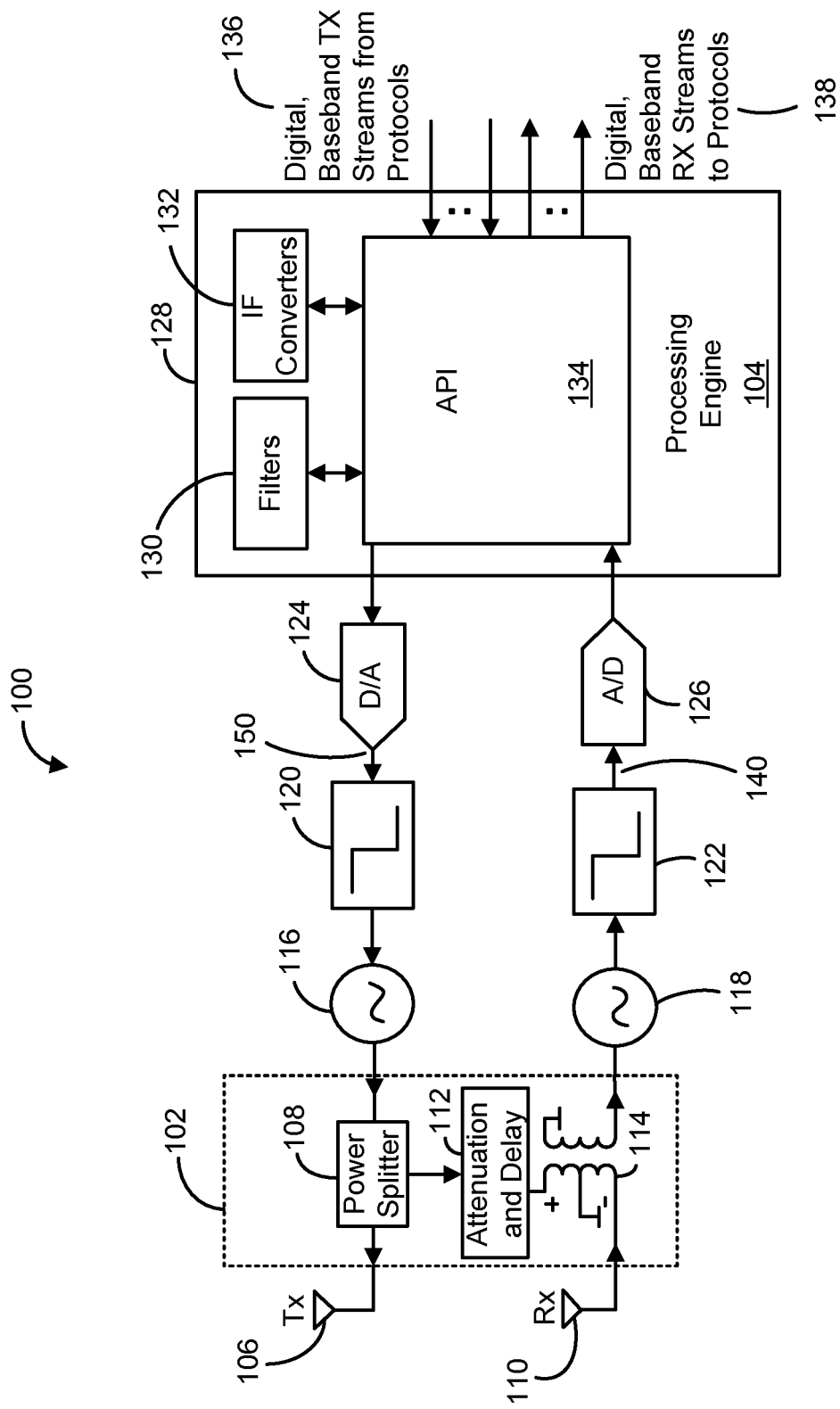
FIG. 1 is a simplified block diagram of a full-duplex wireless communication system, in accordance with one embodiment of the present invention.

FIG. 1 is a simplified block diagram of a full-duplex wireless communication device 100, in accordance with one embodiment of the present invention. Wireless communication device 100, which may be a cellular phone, a base station, an access point or the like, is configured to transmit data/signals via a downlink and receive data/signals via an uplink. Wireless communication device (herein alternatively referred to as device) 100 is shown, as including, in part, a digital-to-analog converter (DAC) 122, a filter 120, a frequency upconverter 116, and a transmit antenna 106 disposed in the transmit path 150. Device 100 is further shown as including, in part, a receive antenna 110, a frequency down converter 118, a filter 122, and an analog-to-digital converter (ADC) 126 disposed in the receive path 140. Device 100 is also shown as including a processing engine 104, and a self-cancellation circuit 102. Processing engine 104 is configured to control/process various operations as described further below. Self-cancellation circuit 102, in turn, is shown as including a power splitter 108, an attenuation and delay circuit 120, and a balun 114. Device 100 may be compatible and operate in conformity with one or more communication standards such as WiFi™, Bluetooth®, GSM EDGE Radio Access Network ("GERAN"), Universal Terrestrial Radio Access Network ("UTRAN"), Evolved Universal Terrestrial Radio Access Network ("E-UTRAN"), Long-Term Evolution (LTE), and the like.

As shown, the received Radio frequency (RF) signal is converted by frequency downconverter 118 to a baseband signal which is filtered by filter 122 and converted to a digital signal by ADC 126. Processing engine 104 performs baseband signal processing and filtering operations on the signal it receives from ADC 126 and delivers its output signal to devices associated with the same or other communication layers. Likewise, the transmit signal supplied by processing engine 104 is converted to an analog signal by DAC 124, filtered by filter 120 and upconverted to an RF signal by frequency upconverter 116 before being delivered to antenna 106 by splitter 108.

Power splitter 108 is adapted to split and deliver a first portion of the transmit signal to transmit antenna 106 via its high power port, and a second portion of the transmit signal to attenuation and delay circuit 120 via its low power port. Power splitter 108 may be a passive component adapted to deliver, for example, −8 dBc of the signal power it receives to attenuation and delay circuit 120. Attenuation and delay circuit 120 is adapted to generate a multitude of weighted and delayed samples (versions) of the transmit signal it receives, and combine these signals to generate and deliver to balun 114 a signal representative of the self-interference signal received by antenna 110. Balun 114 is adapted to subtract the signal it receives from attenuation and delay circuit 120 from the signal it receives from antenna 110 and deliver the resulting signal to frequency downconverter 118. Accordingly, the self-interference component of the signal supplied by balun 114 to frequency upconverter 118 is canceled or substantially degraded. In one embodiment, self-cancellation circuit 102 may cancel, e.g., 20-25 dB of self-interference signal. Self-cancellation circuit 102 is further adapted to adjust the amount of self-cancellation in order to accommodate the dynamic range of ADC 126 and ensure that ADC 126 does not saturate.

Processing engine 104 is configured, among other functions, to resample signal streams. The digital baseband transmission streams 136 received by processing engine 104 may be up-sampled (e.g., from 40 Msamples/sec to 200 Msamples/sec) by an up-sampler disposed in processing engine 104. Processing engine 104 is further configured to low-pass filter the up-sampled streams to remove undesirable aliases of the up-sampled streams. Processing engine 104 is further shown as including, in part, a multitude of filters 130, intermediate frequency (IF) converters 132, and an application programming interface ("API") 134. Filters 130 may be programmable and include one or more finite impulse response ("FIR") filters, one or more infinite impulse response ("IIR") filters, and the like. In one embodiment, one or more of the programmable digital filters disposed in processing engine 104 remove the remaining self-interference signal that may be present at the output of self-cancelation circuit 102. Intermediate frequency converters 132 are adapted to convert the incoming digital baseband 136 to a digital intermediate frequency ("IF") when necessary.

API 134 is adapted to program and interconnect one or more of the filters 130, program the IF converter 132 to achieve the desired results, configure the up/down samplers, and up/down converters. API 134 is further adapted to coordinate the flow of signal streams across the various components disposed in filters 130 and IF converters 132, collect the incoming signal streams 136, add them, and send the resulting stream to DAC 124. For the signals that processing engine 104 receives from the receive path, API 134 performs the above signal processing/control operations in reverse.

Figure 2:
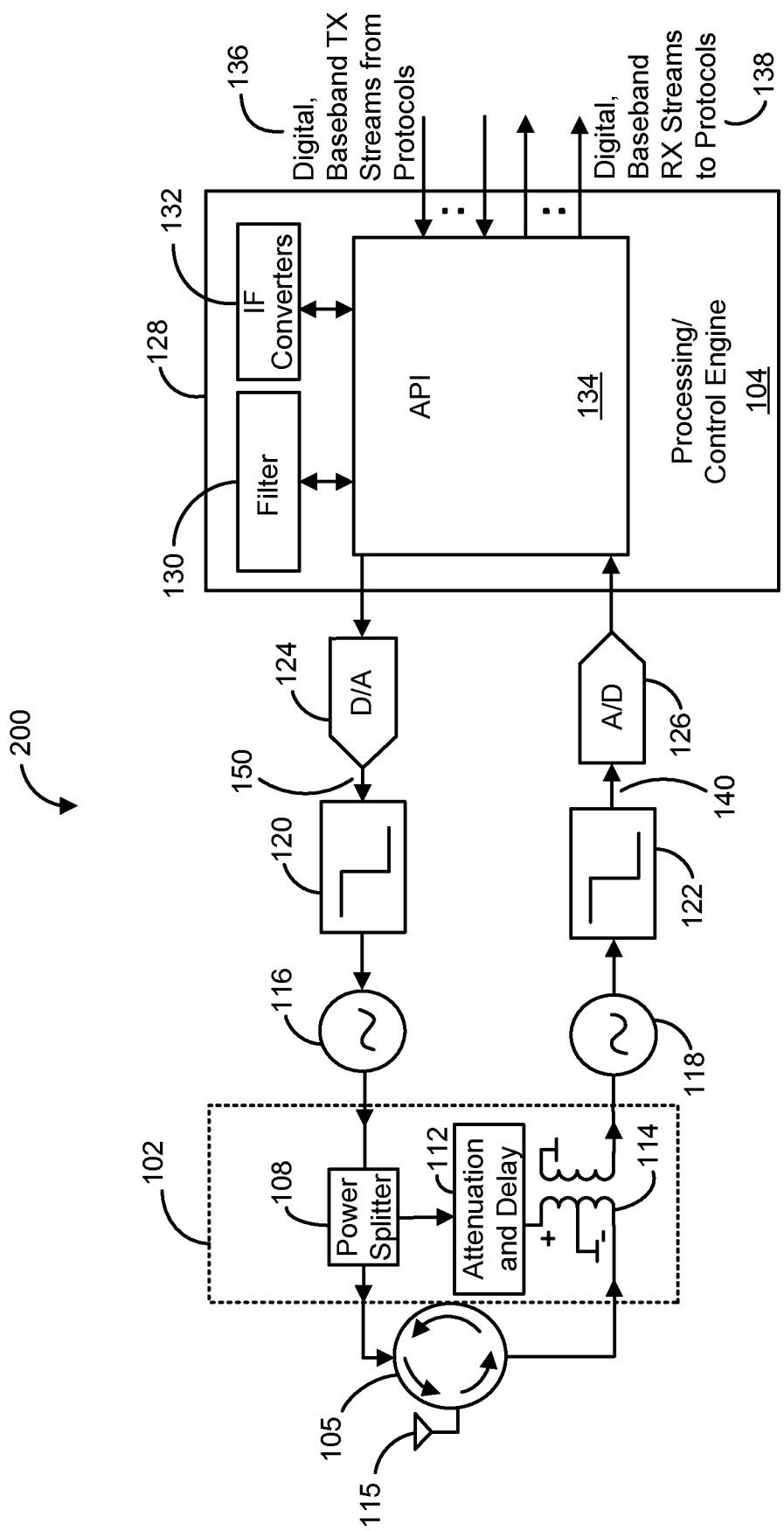
FIG. 2 is a simplified block diagram of a full-duplex wireless communication system, in accordance with another embodiment of the present invention.

FIG. 2 is a simplified block diagram of a full-duplex wireless communication device (hereinafter alternatively referred to as device) 200, in accordance with another embodiment of the present invention. Device 200 is similar to device 100 except that device 200 has a single antenna 115 for both transmission and reception of signals. Device 200 also includes a circulator 105 that provides isolation between its ports. Circulator 105 is adapted to concurrently deliver the transmit signal and the receive signal to and from the antenna 115. The transmit signal is passed through power splitter 108 which delivers a relatively large portion (e.g. 85%) of the transmit signal power to the transmit antenna 115, and a relatively smaller portion of the transmit signal to attenuation and delay circuit 102. In one exemplary embodiments, circulator 105 provides approximately 15 dB of isolation between the transmit and receive paths, thereby reducing the self-interference on the receive port by approximately 15 dB.

Figure 3:
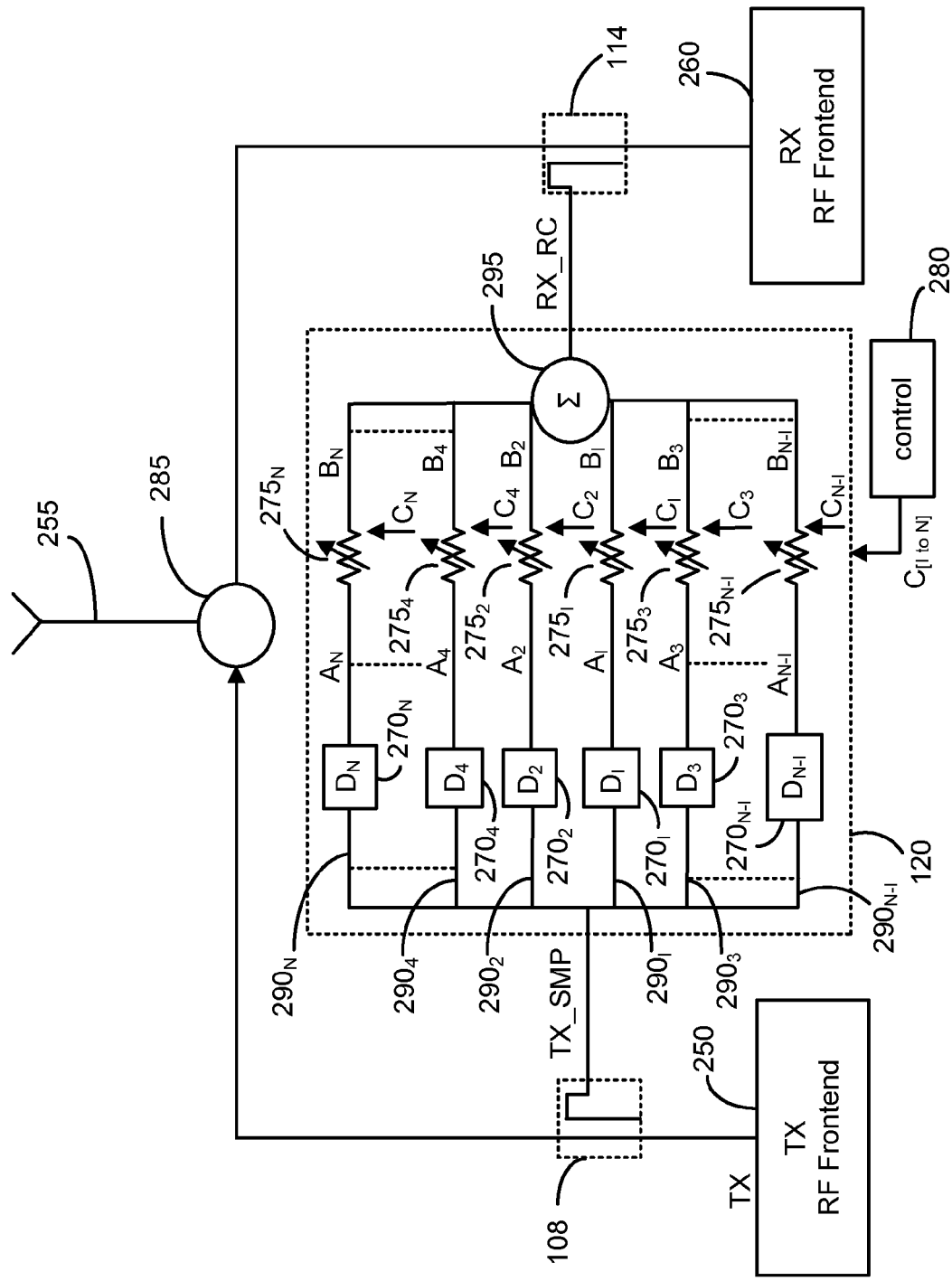
FIG. 3 is a simplified block diagram of the attenuation and delay circuitry disposed in the full-duplex wireless communication systems of FIGS. 1 and 2, in accordance with one embodiment of the present invention.

FIG. 3 is a simplified block diagram of an exemplary attenuation and delay circuit 120, as shown in FIGS. 1 and 2, in communication with a transmit front end block 250 and a receive front end block 260. Antenna 255 is coupled to both the receive front end 260 and the transmit front end 250 via isolator 285. As described above, a portion of the transmit signal Tx leaks into and is present in the receive signal RX in the form a self-interference signal. Attenuation and delay circuit 120 is adapted to generate a signal RX_RC that represents the self-interference signal. The self-interference signal RX_RC is subtracted from the receive signal RX by subtractor 114, the output signal of which is delivered to RF front end block 260 for further processing, as described above in reference to FIGS. 1 and 2

As shown, attenuation and delay circuit 120 receives a sample TX_SMP of the transmit signal TX via splitter 108. Attenuation and delay circuit 120 is shown as including a multitude of paths $290_1, 290_2 \ldots 290_{N-1}, 290_N$, where N is an integer greater than or equal to 2. Each path is shown as including a delay element $270_i$, where i is an index varying from 1 to N, and a variable attenuator $275_i$. The delay elements $290_i$ may generate a fixed or a variable delay. The level of attenuation of each variable attenuator $270_i$ may be varied in accordance with a predefined algorithm implemented by controller 280. Each delay element $270_i$ is adapted to generate a signal $A_i$ that is a delayed version of signal TX_SMP. Each variable attenuator $275_i$ is adapted to attenuate the amplitude of the signal $A_i$ it receives in accordance with the control signal $C_i$ applied thereto by controller 280 so as to generate an attenuated (weighted) signal $B_i$. Accordingly, signals $B_i$ are different delayed and weighted versions of signal TX_SMP. Combiner 295 combines signals $B_i$ to generate signal RX_RC representative of the self-interference component of the transmit signal. In one embodiment combiner 295 is an adder adding signals $B_i$ to generate signal RX_RC. In other embodiments, combiner 295 may perform other arithmetic or logic functions on signals $B_i$ to generate signal RX_RC.

As described above, attenuation and delay circuit 120 is operative to reconstruct the self-interference signal from the signal values present on paths (alternatively referred to herein as taps) $290_i$. Since both the self-interference signal and the time-delayed, weighted signals $B_i$ present on the taps are samples of the same transmit signal, the reconstruction of the self-interference signal is similar to band-limited interpolation. Furthermore, since only a finite number of taps are available, a windowed interpolation may be used to reconstruct signal RX_RC representative of the self-interference signal. Therefore, the signal representative of the self-interference signal, in accordance with one embodiment of the present invention, is generated from signals $B_i$ that are delayed and weighted versions of the same sampled transmit signal TX_SMP.

To generate a signal representative of the self-interference signal, in accordance with one exemplary embodiment, the delays generated in each pair of associated paths (taps) $290_i$ are selected such that the arrival time of the self-interference signal at subtractor 114 falls within the difference between these two delays (also referred to herein as the delay window). Accordingly, the delay generated by a first tap in each pair of associated taps $290_i$ is less than the arrival time of the self-interference signal at subtractor 114 (referred to herein as $T_{self\_int}$) and the delay generated by a second tap in each pair of associated taps $290_i$ is greater than $T_{self\_int}$. In one embodiment, the center two taps, namely taps $290_1$ and $290_2$, form the first pair of associated taps such that, for example, the delay $TL_1$ generated by delay element $270_1$ is less than $T_{self\_int}$ and the delay $TH_1$ generated by delay element $270_2$ is greater than $T_{self\_int}$. $TL_1$ and $TH_1$ are thus selected to be the closest such delays to $T_{self\_int}$. The next two taps closest to the center taps, namely taps $290_3$ and $290_4$, form the second pair of associated taps such that, for example, the delay $TL_2$ generated by delay element $270_3$ is less than $T_{self\_int}$ and the delay $TH_2$ generated by delay element $270_4$ is greater than $T_{self\_int}$. $TL_2$ is shorter than $TL_1$, and $TH_2$ is longer than $TH_1$, therefore $TL_2$ and $TH_2$ are selected to be the second closest such delays to $T_{self\_int}$. The delay of the remaining pairs of associated taps are similarly selected and thus are not described herein. It is understood that in other embodiments, associated taps may be arranged and selected differently. For example, in another embodiment, taps $290_1$ and $290_4$ may be selected as associated taps and used to form a delay window.

The following description is made with reference to an arrangement according to which the center taps $290_1$ and $290_2$ form the first pair of associated taps, the next two taps $290_3$ and $290_4$ form the second pair of associated taps, the next two taps $290_5$ and $290_6$ form the third pair of associated taps, . . . , and the last two taps $290_{N-1}$ and $290_N$ form the last pair of associated taps, as described above. Furthermore, in the following, the delays and interpolations associated with only 2 pairs of associated taps, namely associated taps $290_1$/$290_2$ and associated taps $290_3$/$290_4$ are described. It is understood, however, that similar operations may be performed for all other taps regardless of the number of taps disposed in attenuation and delay circuit 120.

Figure 4:
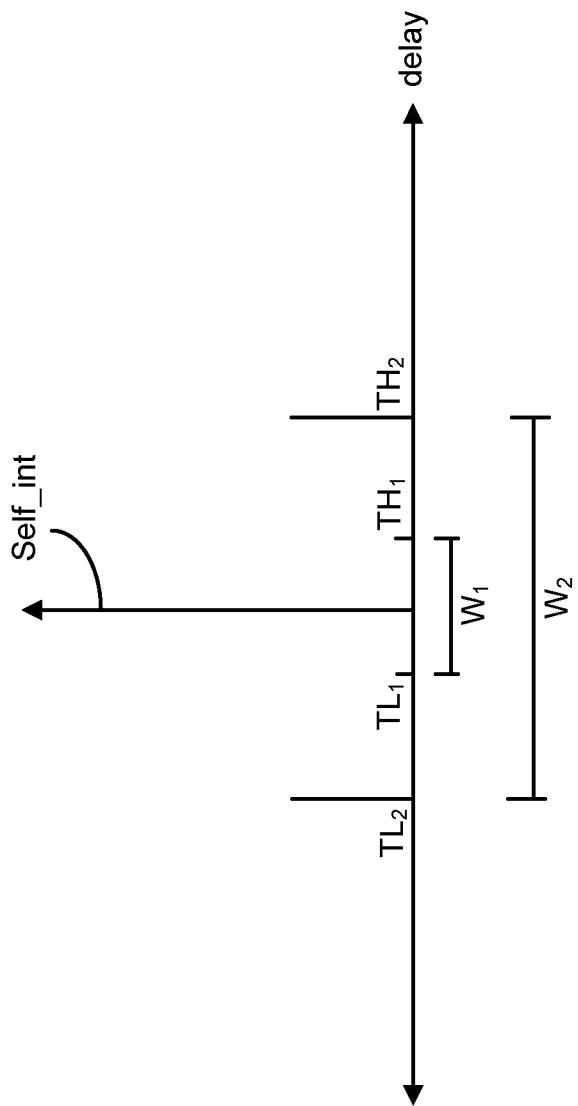
FIG. 4 shows first and second windows each defined by the delays of different pairs of associated paths of the attenuation and delay circuitry of FIG. 3, in accordance with one embodiment of the present invention.

As shown in FIG. 4, $TL_1$ represents the time around which signal $B_1$ is generated (the delays across attenuators $275_i$ are assumed to be negligible relative to the delays across delay elements $270_i$), $TH_1$ represents the time around which signal $B_2$ is generated, $TL_2$ represents the time around which $B_3$ is generated, and $TH_2$ represents the time around which signal $B_4$ is generated. As is seen, time delays $TH_1$ and $TL_1$ are selected (using delay elements $270_1$ and $270_2$) such that $T_{self\_int}$ falls within the window $W_1$ defined by the difference $TH_1$-$TL_1$. Likewise, time delays $TH_2$ and $TL_2$ are selected such that $T_{self\_int}$ falls within the window $W_2$ defined by the difference $TH_2$-$TL_2$. Accordingly, as described above and shown in FIG. 4, for each pair of associated taps defining a window, the amount of delay generated by one of the delay paths is longer than $T_{self\_int}$, and the amount of delay generated by the other one of the delay paths is shorter than $T_{self\_int}$. For example, referring to window $W_1$, $TH_1$ is greater than $T_{self\_int}$ and $TL_1$ is smaller than $T_{self\_int}$. Although the above description is made with reference to paths $290_1$, $290_2$, $290_3$, and $290_4$ only, it is understood that all the tap delays are selected such that $T_{self\_int}$ falls either within a window defined by any pair of associated paths. If the attenuation and delay path 120 includes an odd number of paths (i.e., N is an odd number), (N-1) of the delay path may be used to form associated pairs, as described above. The delay $T_N$ associated with the last remaining delay path (the Nth path) is selected such that $T_{self\_int}$ falls within a time from $T_N$.

Figure 5:
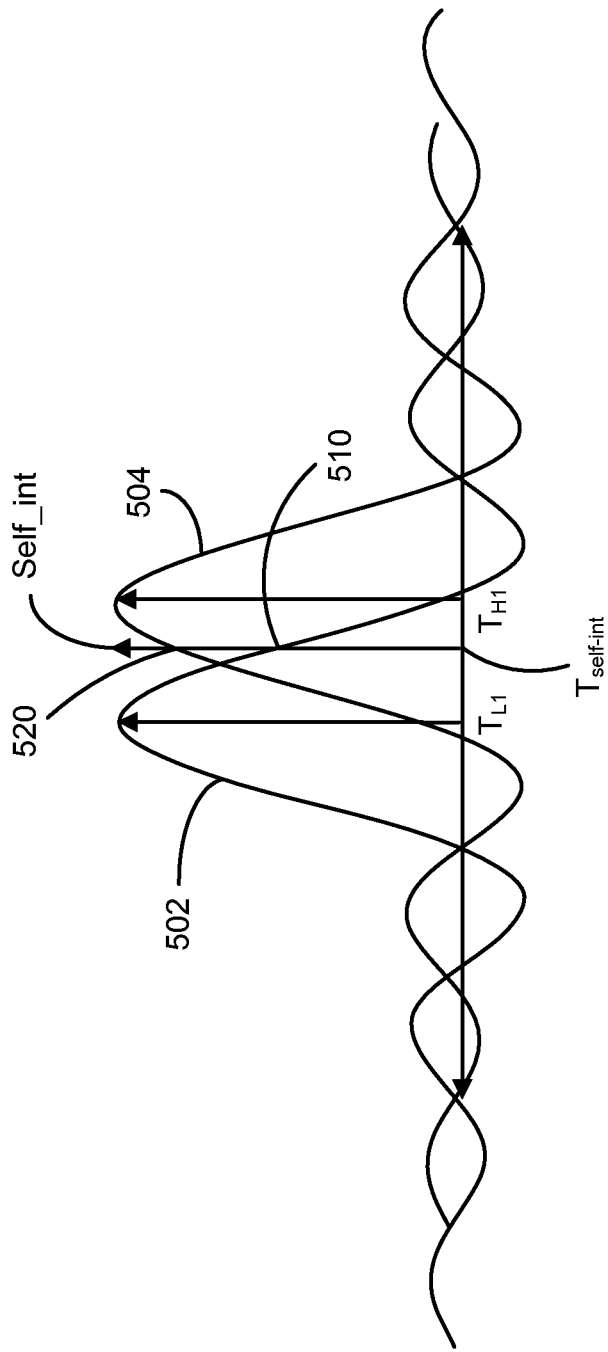
FIG. 5 shows the intersections between the self-interference signal and a pair of sinc functions centered at the boundaries of the first window of FIG. 4, in accordance with one embodiment of the present invention.
Figure 6:
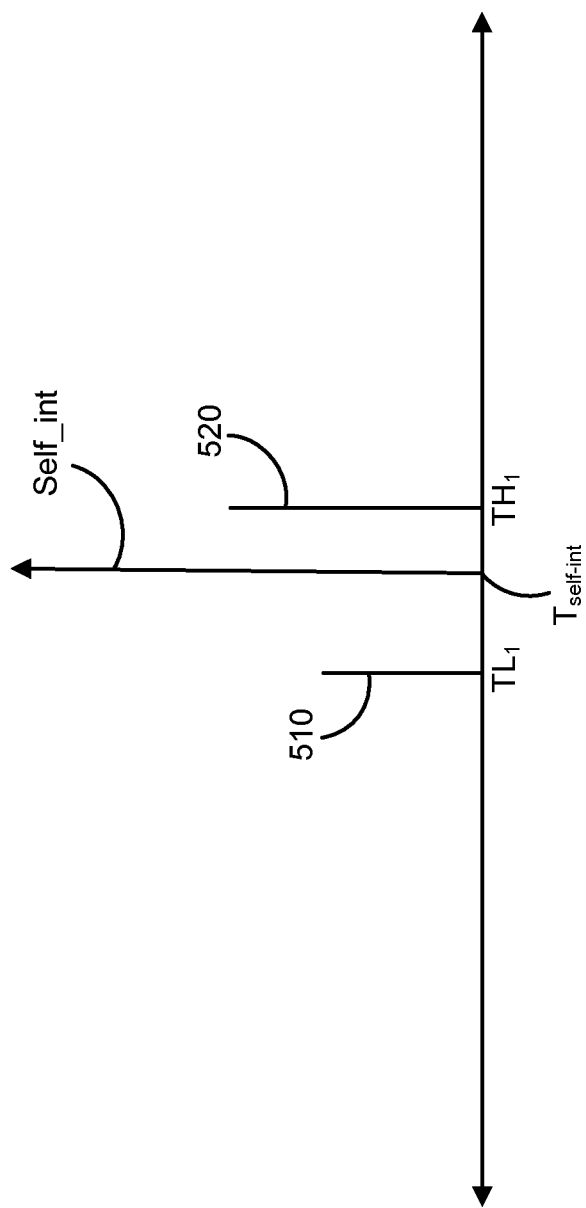
FIG. 6 shows the level of attenuations applied to the pair of signals travelling in the paths defining the first window shown in FIG. 5, in accordance with one embodiment of the present invention.

To determine the level of attenuation for each attenuator $275_i$, in accordance with one exemplary embodiment of the present invention, sinc interpolation is used; it is however understood that any other interpolation scheme may also be used. To achieve this, for each window, the intersection of a pair of sinc functions—each centered at one of the window boundaries and each having a peak value substantially equal to the peak value of an estimate of the self-interference signal—and the estimate of the interference signal, shown as Self_int, is determined. For example, referring to FIG. 5, sinc function 502 centered at $TL_1$ is seen as intersecting the estimate of the self-interference signal Self_int at point 510, and sinc function 504 centered at $TH_1$ is seen as intersecting signal Self_int at point 520. The heights of points 510 and 520 define the level of attenuations applied to attenuators $275_1$ and $275_2$, respectively. FIG. 6 shows the attenuation levels 510, 520 so determined and applied to attenuators $275_1$ and $275_2$ respectively.

Since the amplitude and delay of the self-interference signal is not known in advance, as described above, an estimate (signal Self_int) of both the delay and amplitude of the self-interference signal is initially used by control block 280 for interpolation. As described further below, the initial estimates are used to determine the attenuation levels of the attenuators $275_i$, thereby to generate signals $B_i$ which are subsequently combined to generate signal RX_RC. The amount of self-interference at the receiver is then measured to determine whether one or more conditions are satisfied. One such condition may be to determine whether the amount of self-interference has reached below a minimum threshold level. If the condition(s) is not met, an iterative optimization algorithm is performed by control block 280 to arrive at new estimate(s) for either the delay or amplitude, or both the delay and amplitude, of the self-interference signal. The new estimate(s) are subsequently used, as described further below, to generate new attenuation levels for the attenuators, in turn resulting in generation of revised signals $B_i$ as well as revised self-interference signal. The process of measuring the level of the self-interference signal being canceled or reduced at the receiver, arriving at a new estimate for the self-interference signal based on such measurement, and varying the attenuation levels of the attenuators in response continue until the predefined condition(s) is met.

Figure 7:
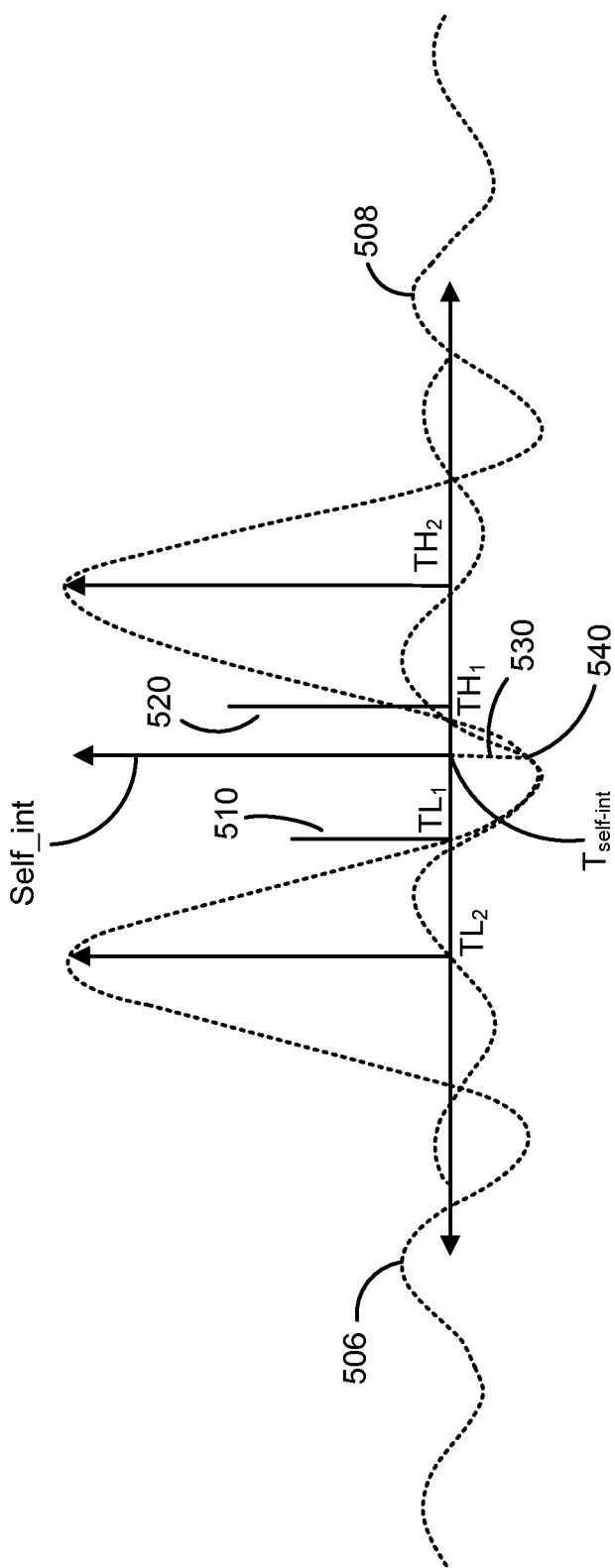
FIG. 7 shows the intersections between the self-interference signal and a pair of sinc functions centered at the boundaries of the second window of FIG. 4, in accordance with one embodiment of the present invention.
Figure 8:
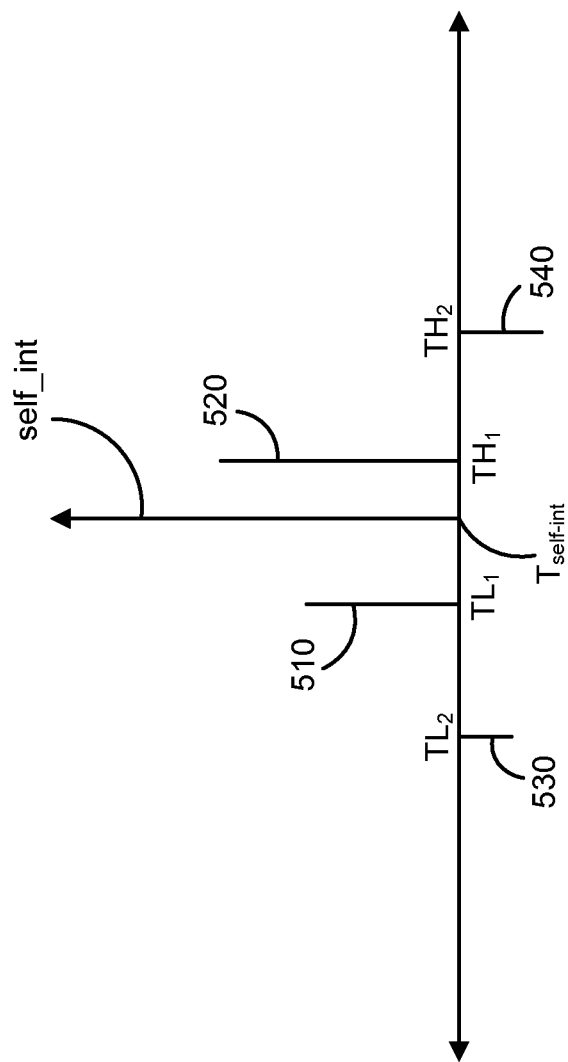
FIG. 8 shows the level of attenuations applied to the two pairs of signals travelling in the paths defining the first and second windows shown in FIG. 5, in accordance with one embodiment of the present invention.

FIG. 7 shows the intersection of sinc functions positioned at the window boundaries $TL_2$ and $TH_2$ with the self-interference signal. As is seen, sinc function 506 centered at $TL_2$ is seen as intersecting the self-interference signal at point 530, and sinc function 508 centered at $TH_2$ is seen as intersecting the self-interference signal at point 540. The heights of points 530 and 540 define the level of attenuations applied to attenuators $275_3$ and $275_4$, respectively. FIG. 8 shows the attenuation levels 510, 520, 530, 540 so determined and applied to attenuators $275_1$, $275_2$, $275_3$, and $275_4$ respectively. As is seen in FIGS. 7 and 8, the attenuations levels applied to attenuators $275_1$, $275_2$ have positive values (have a positive polarity), whereas the attenuations levels applied to attenuators $275_3$, $275_4$ have negative values and thus have a negative polarity. It is understood that the attenuation levels for the remaining taps are similarly determined. Further details regarding the application of the sampling theory to reconstruct a sampled signal is provided in "Multirate Digital signal Processing" by Ronald E. Crochiere, and Lawrence R. Rabiner, Prentice-Hall Processing series, 1983, the content of which is incorporated herein by reference in its entirety.

Combiner 295 is adapted to combine signals $B_1, B_2 \ldots B_N$ thereby to generate signal RX_RC representative of the self-interference signal. As the delay of the self-interference signal changes and its position within the windows moves, the intersections of the self-interference signal and the sinc functions change, thereby causing the attenuation levels to change, which in turn causes the reconstructed signal representative of the self-cancelation signal to also change to track the self-interference signal.

Figure 9:
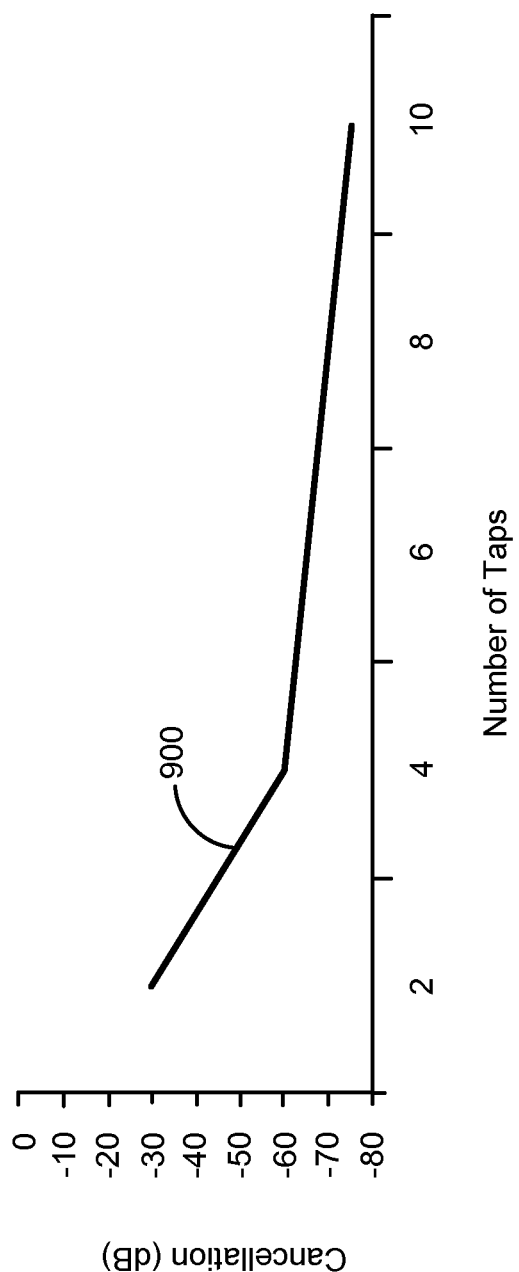
FIG. 9 is an exemplary plot showing the relationship between the number of delay/attenuation paths and the amount of cancellation, in accordance with one embodiment of the present invention.

The higher the number of taps, the greater is the amount of self-interference. FIG. 9 is an exemplary plot 900 of the amount of self-interference cancellation as a function of the number of taps. As is seen, the amount of self-interference cancellation for two taps and ten taps are respectively shown as being approximately −30 dB and −75 dB. In other words, by increasing the number of taps, self-interference cancellation on a wider bandwidth is achieved.

Figure 10:
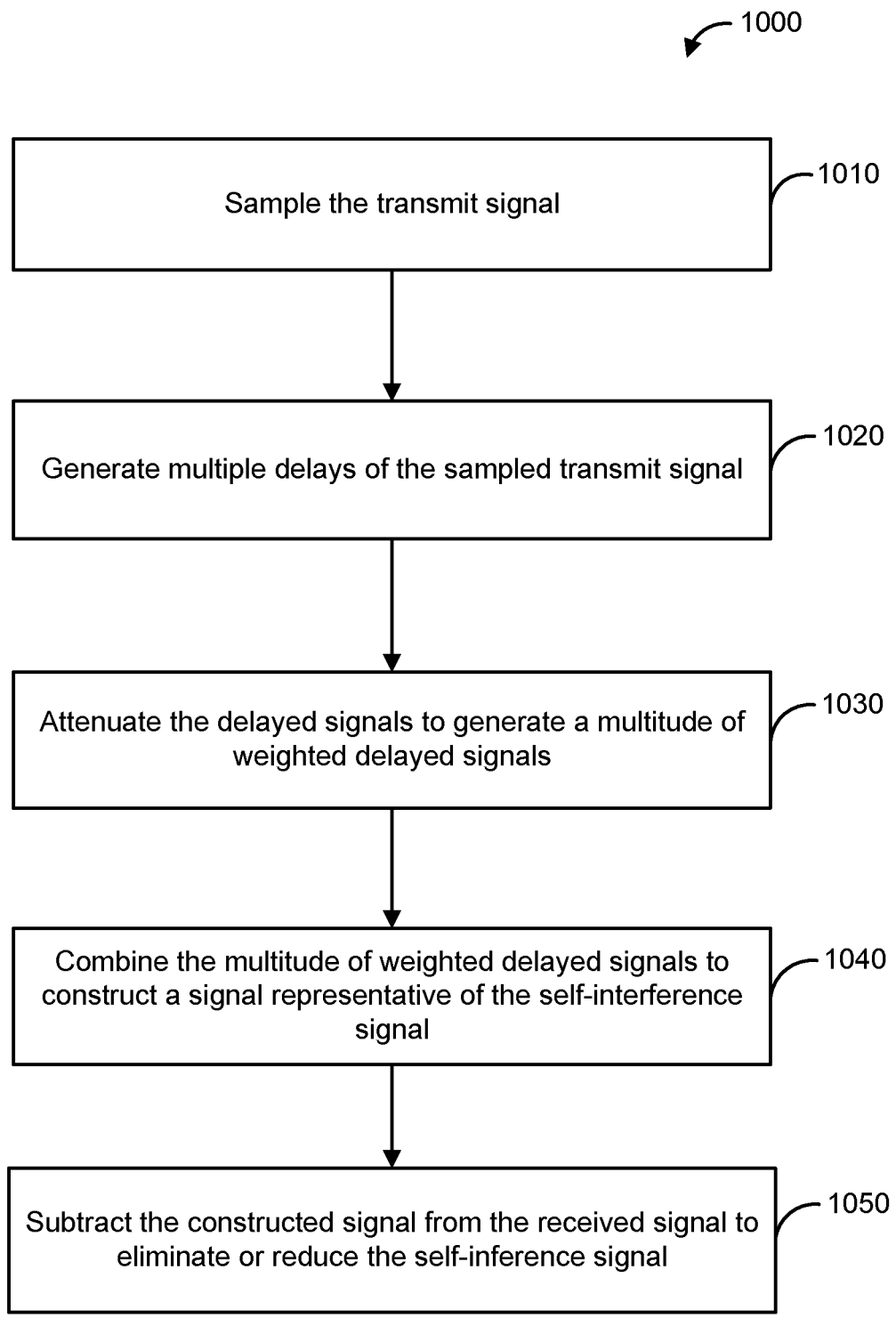
FIG. 10 is a flowchart for cancelling or reducing a self-interference signal, in accordance with one embodiment of the present invention.

FIG. 10 shows a flowchart 1000 for canceling or reducing the self-interference signal at a receiver of a communication device, in accordance with one embodiment of the present invention. To achieve this, the transmit signal is sampled 1010. Thereafter, a multitude of delayed version of the sampled transmit signal are generated 1020. The delayed versions of the sampled transmit signal are attenuated 1030 to generate a multitude of weighted and delayed signals. The multitude of weighted, delayed signals are thereafter combined 1040 to reconstruct a signal representative of the self-interference signal. The reconstructed signal is subsequently subtracted from the received signal to cancel or reduce the self-interference signal at the receiver.

The above embodiments of the present invention are illustrative and not limitative. The embodiments of the present invention are not limited by the transmitter or receiver used in the communication device. The embodiments of the present invention are not limited by the number of taps used to reconstruct the self-interference signal, nor are they limited by the frequency of signal transmission/reception. The embodiments of the present invention may be implemented in hardware, software, firmware and/or combinations thereof. One or more embodiments may include instructions stored in non-transitory computer readable storage medium for execution by one or more processors. Other additions, subtractions or modifications are obvious in view of the present disclosure and are intended to fall within the scope of the appended claims.

What is claimed is:

1. A wireless communication device comprising:
   at least one antenna for receiving or transmitting a signal;
   a cancellation circuitry adapted to receive a first sample of a transmit signal, said cancellation circuitry comprising:
   a control block;
   a subtractor;
   N paths, each path comprising a delay element and an associated variable attenuator whose attenuation level varies in response to the control block, each path receiving the first sample of the transmit signal and generating a delayed and weighted version of the first sample of the transmit signal; wherein a delay element disposed in a first one of the N paths generates a delay shorter than a self-interference arrival time, and wherein a delay element disposed in a second one of the N paths generates a delay longer than the self-interference arrival time; wherein the self-interference arrival time is a delay between arrival of a second sample of a transmit signal at the cancellation circuitry and arrival of a corresponding self-interference signal at the subtractor; wherein the corresponding self-interference signal comprises self-interference resulting from transmission of the second sample of the transmit signal;
   a combiner adapted to combine the N delayed and weighted versions of first sample of the transmit signal to construct a signal representative of a first portion of a self-interference signal;
   wherein the subtractor is adapted to subtract the constructed signal from a received signal, wherein N is an integer greater than or equal to 2.

2. The wireless communication device of claim 1 wherein said N paths comprise 2M paths forming M associated pairs of delay paths, the delays generated by the delay elements of each associated pair of delay paths forming a window within which the corresponding self-interference signal arrives at the subtractor.

3. The wireless communication device of claim 2 wherein N is equal to 2M.

4. The wireless communication device of claim 2 wherein said controller determines the attenuation levels of the variable attenuators in accordance with values of intersections of an estimate of the self-interference signal and 2M sinc functions centered at boundaries of the M windows.

5. The wireless communication device of claim 4 wherein a peak value of at least a subset of the 2M sinc functions is set substantially equal to an amplitude of the estimate of the self-interference signal.

6. The wireless communication device of claim 1 wherein said cancellation circuitry further comprises:
   a splitter adapted to generate the sampled transmit signal in response to the transmit signal.

7. The wireless communication device of claim 6 wherein said subtractor is a balun.

8. The wireless communication device of claim 7 further comprising:
   an isolator having a first port coupled to the antenna, a second port coupled to a transmit line of the wireless communication device, and a third port coupled to a receive line of the wireless communication device.

9. The wireless communication device of claim 8 wherein said isolator is a circulator.

10. The wireless communication device of claim 1 further comprising:
    a frequency downconverter configured to downconvert an output signal of the subtractor;
    a filter adapted to filter out unselected portions of the downconverted signal; and
    an analog-to-digital converter adapted to convert an output signal of the filter to a digital signal.

11. The wireless communication device of claim 10 further a processing engine configured to remove a second portion of the self-interference signal from the output signal of the analog-to-digital converter.

12. The wireless communication device of claim 11 wherein said processing engine comprises a plurality of programmable filters.

13. The wireless communication device of claim 10 further comprising:
    a frequency upconverter configured to upconvert a transmit signal;
    a filter adapted to filter out unselected portions of the upconverted signal; and
    a digital-to-analog converter adapted to convert an output signal of the filter to an analog signal.

14. A method of canceling or reducing a self-interference signal, the method comprising:
    receiving a first sample of a transmit signal at a receiver;
    generating N delayed versions of the first sample of the transmit signal;
    attenuating the N delayed signals to generate N attenuated and delayed signals;
    combining the N attenuated and delayed signals to generate a combined signal representative of a first portion of a self-interference signal;
    subtracting the combined signal from a received signal;
    setting a first delay, corresponding to a first one of the N delayed versions of the first sample of the transmit signal, to a value less than a self-interference arrival time; and
    setting a second delay, corresponding to a second one of the N delayed versions of the first sample of the transmit signal, to a value greater than the self-interference arrival time;
    wherein the self-interference arrival time is a delay between arrival of a second sample of a transmit signal at the cancellation circuitry and arrival of a corresponding self-interference signal at the subtractor; wherein the corresponding self-interference signal comprises self-interference resulting from transmission of the second sample of the transmit signal.

15. The method of claim 14 further comprising:
    forming M time windows;
    selecting the N delays such that the self-interference arrival time falls within each of the M time windows.

16. The method of claim 15 wherein N is equal to 2M.

17. The method of claim 15 further comprising:
    attenuating the N delayed signals in accordance with values of intersections of an estimate of the self-interference signal and 2M sinc functions centered at boundaries of the M windows.

18. The method of claim 17 further comprising:
    setting a peak value of at least a subset of the 2M sinc functions substantially equal to an amplitude of the estimate of the self-interference signal.

19. The method of claim 14 further comprising:
receiving the first sample of the transmit signal from a splitter.

20. The method of claim 19 further comprising:
subtracting the combined signal from the received signal via a balun.

21. The method of claim 20 further comprising:
coupling a first port of an isolator to an antenna used by the receiver to receive signals;
coupling a second port of the isolator to the receiver; and
coupling a third port of the isolator to a transmitter causing self-interference at the receiver.

22. The method of claim 21 wherein said isolator is a circulator.

23. The method of claim 14 further comprising:
downconverting the difference between the combined signal and the received signal to generate a downconverted signal;
filtering out unselected portions of the downconverted signal; and
converting the filtered signal to a digital signal.

24. The method of claim 23 further comprising:
removing a second portion of the self-interference signal from the converted digital signal.

25. The method of claim 24 further comprising:
removing a second portion of the self-interference signal from the converted digital signal using a plurality of programmable filters.

26. The method of claim 23 further comprising:
upconverting a transmit signal;
filtering out unselected portions of the upconverted signal; and
converting the filtered signal to an analog signal.

* * * * *